United States Patent
Brier

(10) Patent No.: US 10,666,421 B2
(45) Date of Patent: May 26, 2020

(54) METHOD OF ENCRYPTION, METHOD FOR DECRYPTING, DEVICES AND PROGRAMS

(71) Applicant: INGENICO GROUP, Paris (FR)

(72) Inventor: Eric Brier, Malissard (FR)

(73) Assignee: INGENICO GROUP, Paris (FR)

( * ) Notice: Subject to any disclaimer, the term of this patent is extended or adjusted under 35 U.S.C. 154(b) by 112 days.

(21) Appl. No.: 15/579,820

(22) PCT Filed: Jun. 6, 2016

(86) PCT No.: PCT/EP2016/062766
§ 371 (c)(1),
(2) Date: Dec. 5, 2017

(87) PCT Pub. No.: WO2016/193493
PCT Pub. Date: Dec. 8, 2016

(65) Prior Publication Data
US 2018/0359080 A1 Dec. 13, 2018

(30) Foreign Application Priority Data

Jun. 5, 2015 (FR) ...................................... 15 55173

(51) Int. Cl.
*G06F 12/14* (2006.01)
*H04L 9/06* (2006.01)
(Continued)

(52) U.S. Cl.
CPC .............. *H04L 9/0618* (2013.01); *G06F 8/42* (2013.01); *G06F 21/125* (2013.01); *G06F 21/602* (2013.01); *G09C 1/00* (2013.01); *H04L 9/00* (2013.01); *H04L 2209/127* (2013.01); *H04L 2209/16* (2013.01); *H04L 2209/34* (2013.01)

(58) Field of Classification Search
None
See application file for complete search history.

(56) References Cited

U.S. PATENT DOCUMENTS

2003/0221116 A1* 11/2003 Futoransky ........... G06F 21/125
713/189

FOREIGN PATENT DOCUMENTS

GB 2492618 A 1/2013

OTHER PUBLICATIONS

English Translation of the International Preliminary Report on Patentability dated Sep. 18, 2017 for International Application No. PCT/EP2016/062766.
(Continued)

*Primary Examiner* — Brandon S Hoffman
(74) *Attorney, Agent, or Firm* — David D. Brush; Westman, Champlin & Koehler, P.A.

(57) ABSTRACT

A method is provided for encrypting a code of a computer program using an encryption key selected from among at least two encryption keys. Such a method includes: obtaining a descriptive grammar of the language of the code to be encrypted; encoding the code by using the descriptive grammar delivering a character string within which at least one start instruction of the code is encoded as a representation in the character string; encryption of the character string by using the encryption key belonging to the set of encryption keys, delivering an encrypted string. A method of decryption includes the inverse steps and also makes use of the descriptive grammar of the code.

9 Claims, 2 Drawing Sheets

(51) Int. Cl.
*G06F 21/60* (2013.01)
*H04L 9/00* (2006.01)
*G09C 1/00* (2006.01)
*G06F 21/12* (2013.01)
*G06F 8/41* (2018.01)

(56) References Cited

OTHER PUBLICATIONS

International Search Report and Written Opinion dated Jul. 26, 2016 for International Application No. PCT/EP2016/062766, filed Jun. 6, 2016.
W Thompson: "Cryptomorphic Programming: A Random Program Concept", Jun. 1, 2005 (Jun. 1, 2005), XP055080964.
Willard Thompson et al: "Semantic Encryption Transformation Scheme*", Jan. 1, 2004 (Jan. 1, 2004), XP055267635.

\* cited by examiner ial state is converted into executable software by a machine or a processor. This executable software is composed of instructions known as "machine code" which can be implemented directly by the processor within which the software is executed.
METHOD OF ENCRYPTION, METHOD FOR DECRYPTING, DEVICES AND PROGRAMS

CROSS-REFERENCE TO RELATED APPLICATIONS

This Application is a Section 371 National Stage Application of International Application No. PCT/EP2016/062766, filed Jun. 6, 2016, which is incorporated by reference in its entirety and published as WO 2016/193493 A1 on Dec. 8, 2016, not in English.

1. FIELD OF THE INVENTION

The proposed technique relates to the securing of information exchanges. More specifically, the proposed technique relates data encryption. Even more specifically, the invention relates to the encryption and decryption of a computer code. One reason for encrypting a computer code is to obtain protection against the theft of such a computer code. Once the code is encrypted, it also needs to be decrypted. Thus, the technique relates both to the encryption and the decryption of a computer code.

2. PRIOR ART

In certain sensitive environments, it may be necessary to encrypt a computer code. For example, certain devices such as payment terminals undergo numerous attacks by malicious individuals, companies or governments. Some of these are software attacks. This means that the software program or programs used to make the terminal work are analyzed and inspected in order to try and discover one or more flaws therein. Another attack may consist in decompiling the software, modifying the code thus obtained (by inserting one or more fraudulent instructions into it) and then recompiling the software and re-implanting this modified software in the terminal.

It may be recalled, for all practical purposes, that a software program can assume several states, including an original state in which the software is written or composed in source code and a compiled state in which the software in its original state is converted into executable software by a machine or a processor. This executable software is composed of instructions known as "machine code" which can be implemented directly by the processor within which the software is executed.

As a general rule, devices that comprise sensitive software are physically resistant to attacks. This is the case for example with payment terminals which, when attacked (for example by attempts to open a terminal in order to insert several "probes"), are capable of completely erasing a secured memory or even of putting it out totally out of action.

Thus, it is a very complex matter for an attacker to directly obtain the code of the program inside the protected device. A rather simple way for this attacker, then, would be to retrieve the code for example when the program is updated: such updating operations take place more or less regularly. These operations generally consist in sending the device a compiled code integrated for example into a piece of firmware. When the device receives the new firmware, it updates itself by installing the new executable program contained in this firmware. Thus, a malicious individual can more easily retrieve a piece of firmware that is transmitted during an update, especially when this firmware is transmitted through a non-secured communications network.

To guard against an undesired retrieval of the firmware and therefore of the code that it contains, the manufacturers of sensitive equipment have encrypted this code or firmware so that, even in the case of interception, the code is protected. The encryption is usually done by using an encryption key. It turns out however, that in the constant struggle between manufacturers and hackers, the latter can nevertheless manage to obtain one or more encryption keys capable of being used to encrypt the compiled source code. The hardware manufacturer then needs to find another solution.

One common prior-art solution could be to individualize the distribution of the compiled software: more particularly, rather than implement a unique or one-time distribution for all the equipment concerned, it can be envisaged to encrypt this software independently for one particular copy of the hardware for which it is intended. Such a "unique" encryption can for example comprise the use of a unique identification number for the apparatus as a parameter of the key-generating function. Thus, each encrypted software program could be decrypted solely by the terminal, the unique identification number of which has been used to create the encryption key. This method could be suitable but raises several problems. The first problem relates to the management of the keys: the method can in fact be applied to a restricted number of copies of devices to be protected. However, when the number becomes too great, then managing the necessary keys can become complicated. The second problem lies in the fact that this solution does not resolve the problem in which the attacker obtains both the update and the key for one and the same apparatus.

Another possibility would be to place the encryption key with a trusted third party. This raises problems in the event of an absence of connectivity to a communications network. Indeed, in addition to an update that uses a communications network, there are also frequent instances where the updates have to be done locally, by using for example a USB key or a memory card. Now this type of update cannot easily be used with a trusted third party who possesses a copy of an encryption or decryption key.

It then becomes necessary to propose an alternative solution that takes account of the fact that the attacker can have one or more keys at his disposal to decrypt the code of the computer program.

3. SUMMARY OF THE INVENTION

The proposed technique does not have these drawbacks of the prior art. More particularly, the proposed technique relates to a method of encryption comprising a specific encoding phase. This encoding phase is said to be smart because it takes account of the content of the code to carry out the encoding. More particular, the invention relates to a method for encrypting a code to be encrypted of a computer program using an encryption key selected from among at least two encryption keys. Such a method comprises:
  a step for obtaining a descriptive grammar of the language of the code to be encrypted;
  a step for encoding the code to be encrypted by means of the descriptive grammar delivering a character string within which at least one start instruction of the code to be encrypted is encoded as a representation in the character string;
  a step of encryption of the character string by means of an encryption key belonging to the set of encryption keys delivering an encrypted string.

Thus, the proposed technique enables an encoding before encryption. However, unlike possibly existing pre-encryption encoding techniques, the encoding carried out in the present technique is a smart encoding. More particularly, the encoding takes account of the source, i.e. the code to be encrypted. In other words, the technique enables the encoding to be integrated as an encryption step in its own right whereas, usually, the encoding is more of a phase used to facilitate the encryption operation. In the technique as proposed, the encoding serves to convert the code to be encrypted according to the meaning of this code.

According to one particular characteristic, said encoding step comprises, for a start instruction of the code to be encrypted, a step for obtaining, within said descriptive grammar, a type of start instruction and a step for obtaining, within said descriptive grammar, an identifier of the start instruction within a cardinal of the type of start instruction.

Thus, the representation of an instruction

According to one particular embodiment, said encoding step comprises, for a start instruction of the code to be encrypted, a step for computing said representation on the basis of said type of start instruction and said identifier of the start instruction within the cardinal of the type of start instruction.

According to one particular embodiment, said encoding step is implemented recursively, a representation of a start instruction being computed at the end of a preliminary computation of a representation of a following instruction of the code to be encrypted.

According to one particular embodiment, said encoding step for encoding the code to be encrypted delivers a character string comprising a unique integer.

Thus, any encryption key is capable of encrypting such a character string.

According to another aspect, a device is also described for encrypting a code to be encrypted of a computer program by means of an encryption key selected from among at least two encryption keys. Such a device comprises:
  means for obtaining a descriptive grammar of the language of the code to be encrypted;
  a module for encoding the code to be encrypted by means of the descriptive grammar delivering a character string within which at least one start instruction of the code to be encrypted is encoded as a representation in the character string;
  means for encrypting the character string by means of an encryption key belonging to the set of encryption keys, delivering an encrypted string.

According to another aspect, the invention also relates to a method for decrypting a code of a computer program by means of an encryption key selected from among at least two encryption keys. Such a method comprises:
  a step for obtaining an encrypted string; this encrypted character string results in principle from an encryption made by means of the method presented here above;
  a step for obtaining an encryption key belonging to the set of encryption keys; these may be the same keys as those that were used to carry out the encryption: or else public or private keys in the case of an asymmetric encryption;
  a step for decrypting the encrypted string by means of an encryption key delivering a character string;
  a step for obtaining a descriptive grammar of the language of the code to be encrypted; a step for decoding the character string by means of the descriptive grammar delivering a decoded character string within which at least one representation in the character string is decoded as an instruction in the form of a decoded character string.

The invention also relates to a device for decrypting a code of a computer program by means of an encryption key selected from among at least two encryption keys. Such a device comprises:
  means for obtaining an encrypted key; this encrypted character string results in principle from an encryption made by means of the method presented here above;
  means for obtaining an encryption key belonging to the set of encryption keys; these may be the same keys as those used to carry out the encryption or else they may be public or private keys in the case of asymmetric encryption;
  means for decrypting the encrypted string by means of the encryption key delivering a character string;
  means for obtaining a descriptive grammar of the language of the code to be encrypted;
  means for decoding the character string by means of the descriptive grammar delivering a decoded character string within which at least one representation in the character string is decoded as an instruction that is a decoded character string.

According to one preferred implementation, the different steps of the methods according to the proposed technique are implemented by one or more software units or computer programs comprising software instructions that are to be executed by a data processor of a relay module according to the proposed technique and being designed to command the execution of the different steps of the methods.

The proposed technique is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The proposed technique is also aimed at providing an information carrier or medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Furthermore, the information medium can be a transmissible medium such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

Each component of the system described here above can of course implement its own software modules.

The different embodiments mentioned here above can be combined with one another to implement the proposed technique.

4. FIGURES

Other features and advantages of the invention shall appear more clearly from the following description of two embodiments, given by way of a simple illustratory and non-exhaustive example and from the appended drawings, of which:

5. DESCRIPTION

5.1. Reminder

Figure 1:
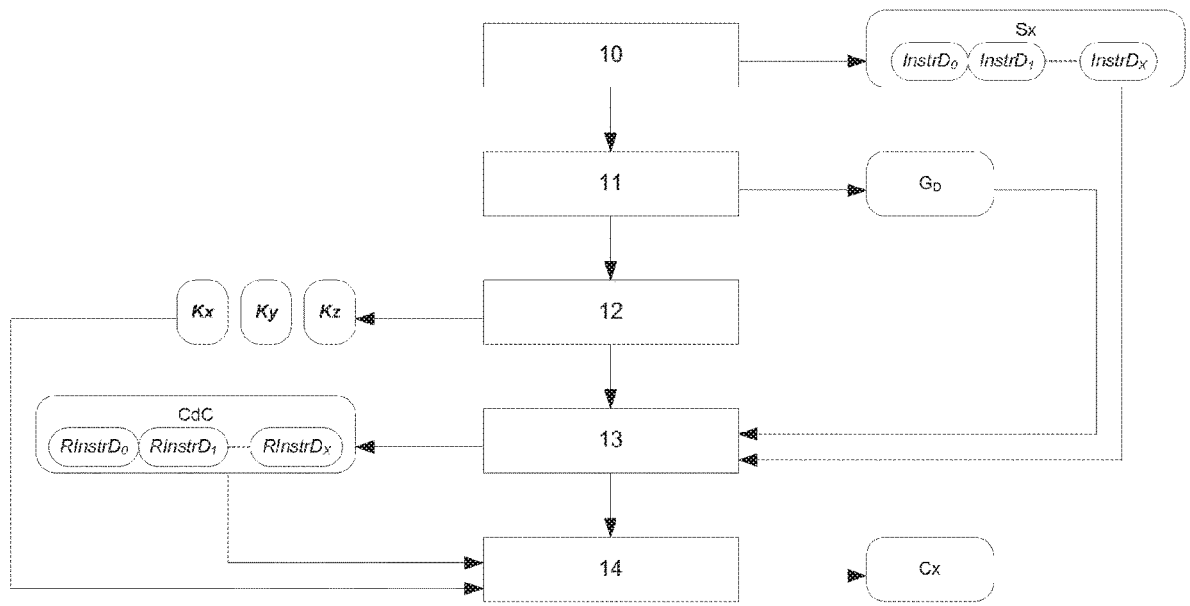
FIG. 1 illustrates the method of encryption of the present technique.

As indicated here above, the described technique consists of the addition, during encryption, of an additional step called an encoding step in which the code to be encrypted (for example the compiled code or intermediate code, i.e. byte code) is converted into a specific character string (for example a character string that contains one and only one long integer or an ASCII string or a string in another encoding base) which is then encrypted. Conversely, on the receiver side, subsequently to the decryption, the character string obtained is decoded according to the decoding process that is the reverse of the encoding process.

However, the technique described is not limited to carrying out an encoding of the code to be encrypted. A particular encoding is done that has the property of producing a character string which on the one hand cannot, in its form, be easily distinguished from another character string and on the other hand can always be decoded to produce a correct code. More particularly, according to the proposed technique, any code whatsoever to be encrypted, the grammar of which is known to the encoder, produces a character string; inversely, any character string, given to the decoder (that comprises the same grammar), produces a correct code: i.e. a code that is syntactically correct, for which it is not possible in principle to give a particular meaning.

Thus, the fact of not directly encrypting the code to be protected but carrying out a particular encoding of this code significantly slows down an attacker who has a set of encryption keys possibly containing the correct key by preventing him from differentiating between a meaningful decryption result from a random (but grammatically correct) result obtained with a wrong key.

By ensuring, through compliance with the grammar (the semantics) of the language of the code, that the decrypted elements of any character string are valid executable codes, the invention obliges the attacker to carry out a case-by-case semantic analysis to try and authenticate the original source code (without any certainty that he will succeed in making such an analysis). Indeed, to be able to carry out such an analysis, the attacker must verify the working of the software obtained by this code. This means that for each decrypted element (each string obtained by a decoding operation), the attacker must optionally compile this decrypted element (when it is source code) and implant it within the device in order to verify the operation of the code. It will be understood that, when the number of keys available is great, these verifying operations are complicated and lengthy to carry out. Hence, it cannot at all be certain that the attacker will be able to speedily achieve his ends.

Theoretically, Sx is taken to be the assembler code of an embedded program that is to be protected by being encrypted (an encrypted code Cx is obtained). As explained earlier, the decryption Kx cannot be entrusted to a trusted third party (because the product is not necessarily online at the time of the update) and must therefore be placed on (or in) the product to be protected (for example on or in the payment terminal). To create confusion for the attacker, a certain number of false keys (Ky, Kz, etc.) are also introduced into the product. Thus, through the technique described, even when the attacker succeeds in obtaining a key (or even several or all the keys) it is more complicated for him to determine whether or not this key is a valid key.

Indeed, let it be assumed that an attacker is capable of retrieving all or part of the set of keys available (Kx, Ky, Kz). Conventionally (i.e. without using the technique that is the object of the present invention), by decrypting the encrypted code Cx with each retrieved key, the attacker obtains either Sx if it is the right key or he obtains some random element (Ry, Rz) if it is the wrong key. In this case, the distinction between the random key (Ry, Rz) and the correct code Sx can be easily established by the attacker and this operation consumes little time and/or money: indeed, either the attacker obtains a code (for example an assembler) that is correct and immediately identifiable or he obtains a random code which in no way resembles an assembler code. When he obtains a random code, the attacker knows that the key used is not the right one and can directly pass to the next key.

Inversely, with the technique described, following the decryption with any one of the keys (Kx, Ky, Kz), the attacker has a character string that must be decoded by making it pass into an appropriate decoder (called a reversible decoder). The reversible decoder is designed in such a way that any input whatsoever produces a correct decrypted code. This is because the decoder, like the encoder, integrates knowledge of the grammar of the code of the program and because the encoding and the decoding are done according to this grammar. Thus, whatever the input into the decoder, an assembler code (or an intermediate code in the case of the byte code), is produced. For an attacker, it is then very difficult to distinguish a code produced with the correct key Kx from a code produced with a decoy (i.e. a key Ky, Kz introduced to deceive the attacker).

The method of encryption of the present technique is described with reference to FIG. 1. This method of encryption comprises:
- a step (10) for obtaining a code to be encrypted (Sx); this code to be encrypted is for example an assembler code or an intermediate code (byte code);
- a step (11) for obtaining a descriptive grammar ($G_D$) of the language of the code to be encrypted;
- a step (12) for obtaining a set of encryption keys (Kx, Ky, Kz);
- a step (13) for encoding the code to be encrypted (Sx) by means of the descriptive grammar ($G_D$) delivering a character string (CdC) within which at least one start instruction (InstrD) of the code to be encrypted (Sx) is encoded as a representation (RInstrD) in the character string (CdC). The representation (RInstrD) is the result of a computation made from the instruction and of parameters linked to the instruction within the grammar;
- a step (14) for encrypting the character string (CdC) by means of an encryption key (Kx) belonging to the set of encryption keys (Kx, Ky, Kz), delivering an encrypted string (Cx).

Thus, the encoding made of the input code takes account of the grammar of the code itself. This enables the introduction of a certain intelligence into the encoding and enables a differentiation from the existing base methods which often consist in encoding by carrying out a base 16 or a base 64 conversion. Inversely, the technique described introduces a certain understanding of what is encoded. Accessorily, in one specific embodiment, the encoding is done recursively. Such an encoding is not obligatory but makes it possible to ensure that the entire process of encoding will have a result that is recursively decodable and therefore more secured since it is absolutely necessary to carry out a full decoding of the string before it can be checked whether this string can possibly correspond to the correct source code. This prevents the attacker from decoding a first word and then a second word, etc. (which would be possible in the event of iterative encoding).

Figure 2:
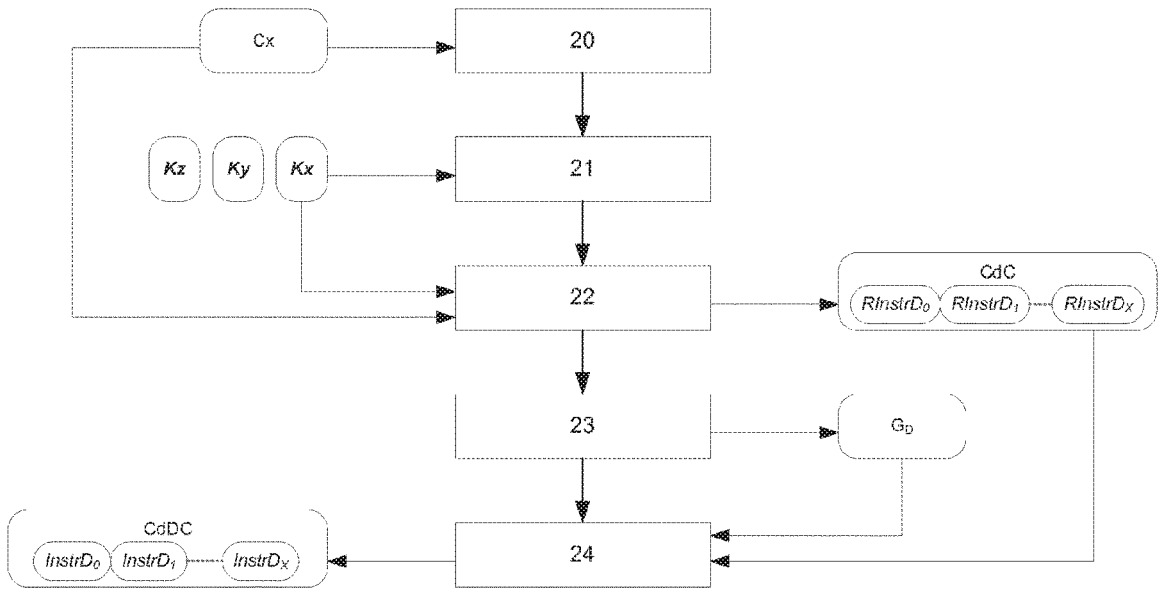
FIG. 2 illustrates the method of decryption of the present technique.

The decryption method of the present technique is described with reference to FIG. 2. It is the inverse of the encryption method. This decryption method comprises:
- a step (20) for obtaining an encrypted string (Cx); this string of encrypted characters results, in principle, from an encryption made by means of the method presented here above;
- a step (21) for obtaining an encryption key (Kx) belonging to the set of encryption keys (Kx, Ky, Kz); these may be the same keys as those used to carry out the encryption (the case of symmetric encryption) or else public or private keys in the case of asymmetric encryption;
- a step of decryption (22) of the encrypted string (Cx) by means of the encryption key (Kx), delivering a character string (CdC);
- a step (23) for obtaining a descriptive grammar ($G_D$) of the language of the code to be encrypted;
- a step (24) for decoding the character string (CdC) by means of the descriptive grammar ($G_D$) delivering a decoded character string (CdDC) within which at least one representation (RInstrD) in the character string (CdC) is decoded into a decoded character string (CdDC) instruction (InstrD); the instruction obtained represents a computation made from a representation (RInstrD) and parameters linked to the instructions within the grammar and especially to the previously decoded instructions: the previously decoded instructions are used to make it possible to determine a sequencing of instructions (and parameters of instructions) that is logical with respect to the grammar.

Naturally, the encryption keys (and possibly decryption keys when they are different) are chosen so that the type of character string is preserved during the encryption or decryption operations. For example, when the decoding module awaits a character string comprising a unique integer at input, then all the decryption keys are chosen to produce, at the end of the decryption, a large integer contained in a character string. Thus, it is not possible to directly distinguish between a valid key and an invalid key since the obtained result (for example in an integer) corresponds to an expected result that is valid for the decoding module. The decoding module having a correct parameter (for example an integer) and the descriptive grammar at input is always capable of producing a correct code at output.

5.2. Embodiment

For this embodiment, a description is provided of a particular method of encoding and a particular method of decoding. More particularly, the encoder produces a long integer (represented for example in the form of a string of digital characters). Inversely, the decoder accepts a long integer and furnishes an assembler code as a result.

It is assumed, in this embodiment, that there is a compiled code (assembler code) comprising a certain number of instructions, each instruction being an instance. These instructions are known to the encoder (and therefore to the decoder) in the form of a grammar. This grammar comprises firstly the list of instructions possible and, secondly, the type of arguments, if any, of these instructions when they have them. Thus, for example an instruction "movb", which is an instruction for writing a value to a register, comprises two parameters which are a value (for example $0x61) and a destination register (for example "% al").

In other words, an assembler code takes the form of instructions of a given size, one part of the instruction being the operation and the remainder being its arguments. It is therefore possible to break down an assembler code, even in binary form, into "words" or "tokens". The code is then represented as a sequence of words or tokens. Each word has a "type" (instruction, address, constant) by which the semantics of the binary code that represent it can be known. Given an original assembler code, it is the semantics (the grammar) of the assembler language used that gives the decoding instructions. Each type has a finite number of instances (for example the number of possible instructions is finite). Each instance of a type has an associated identifier (not zero) within this type.

Thus:
- v denotes the empty word;
- given a non-empty word m (either an instruction, an address, a value, a register number, etc.);
- T(m) is the cardinal of the type of m (i.e. the number of types of non-empty words);
- I(m) is the identifier of m (this identifier can be included between 0 and T(m)−1);
- Sx is the original code (for example the assembler) to be converted; and
- Sx=m S'x, which means that the original code to be converted Sx is equal to a non-empty word m followed by the remainder of the original code to be converted S'x.

In this embodiment, the technique is implemented by means of a software module. This software module is used recursively. The encoding software module is designated by the letters «CRP». The decoding software module is designated by the letters «CRP$^{-1}$». Naturally, the module «CRP» and the module «CRP$^{-1}$» can be one and the same module, acting as an encoder or as a decoder on the basis of an appropriate parametrization.

The result of this is that the encoding (the conversion into integer) of the original code Sx into a (very) long integer is done (recursively) as follows:

CRP(v)=0; and

CRP(m S'x)=T(m)*(CRP(S'x))+I(m).

Note, in the above expression, the recursive call made at "CRP" on S'x.

Thus, the result of CRP(m S'x) is an integer resulting from the multiplication of the cardinal of the type of m [T(m)] by the integer CRP(S'x), a multiplication to which we add the identifier of m [I(m)].

Thus for example the following code:

mov eax, 4 mov ebx, 1 int 80h generates the following integer:

2(2(3(2(2(3(2(3×0+2)+1)+1)+1)+0)+0)+0)+0=792

If we consider the following elements (arbitrarily, for the requirements of the example given and assuming that the encoder "CRP" knows only three types and only the values considered):

mov and int are two types of instructions: the cardinal of the type of mov and int is 2. The identifier of mov is 0 and the identifier of int is 1;

eax and ebx are types of register. The cardinal of the type of eax and ebx is 2. The identifier of ebx is 0 and the identifier of ebx is 1;

4, 1 and 80h are types of values. The identifier of 4 is 0 and the identifier of 1 is 1 and the identifier of 80h is 2.

It can be understood naturally, from the reading of the explanations given, that the major elements for the computation of this integer include T(m) and I(m). These values are acquired by the use of the descriptive grammar.

Depending on an identifier, with an implicit type, we recover the corresponding word (i.e. a start instruction). Thus, in the decoding, the grammar is also brought into play; this ensures that, for a preliminarily decrypted input string, we will always find a decoded string that is grammatically correct. In other words, we will always find a sequence of language code words that means something. To this end, the cardinal of a type of word and the identifier of a word in this cardinal make it possible all at the same time to compute an integer (as explained here above) and, from a given integer, to find a sequence of words of the original language (as is explained here below).

This is appreciably different from the methods of encoding and decoding based for example on a base 16 or base 64 conversion in which the signification of the string that is encoded is of no importance.

Inversely, to decode a natural number n, the invention makes use of CRP$^{-1}$ which recursively uses a decoding function D taking as an argument an expected type T (cardinal |T|) and a natural integer n:

D(0)=v; and

D(n,T)=I$^{-1}$(n mod|T|) D(n/|T|, T').

where the integer division is used and where T' is given by the grammar of the language.

Thus, for the above example:

792=2(2(3(2(2(3(2(3×0+2)+1)+1)+1)+0)+0)+0)+0

We therefore obtain the original code from the types and identifiers given here above. It can be noted for example that the number 793 would not give the same code. Indeed:

793=2(2(3(2(2(3(2(3×0+2)+1)+1)+1)+0)+0)+0)+1

Giving the following code:

int eax, 4 mov ebx, 1 int 80h

It can be noted for example that the number 795 would not give the same code. Indeed:

795=2(2(3(2(2(3(2(3×0+2)+1)+1)+1)+0)+0)+1)+1

Giving the following code:

int eax, 4 mov ebx, 1 int 80h

It can be noted for example that the number 795 will not give the same code. Indeed:

795=2(2(3(2(2(3(2(3×0+2)+1)+1)+1)+0)+0)+1)+1

Giving the following code:

int ebx, 4 mov ebx, 1 int 80h

A major aspect of the proposed technique can thus be understood: when an attacker possesses an encrypted code (Cx) and when he also possesses at least two keys (Kx, Ky) of the set of keys, he applies both keys to the encrypted code (Cx) in order to decrypt this encrypted code. The use of either key enables a decryption of the encrypted code (Cx) and makes it possible to obtain a number (for example 795 and 792). It is now assumed that the attacker also has the decoding module (the module "CRP" or the module "CRP$^{-1}$"). If the attacker applies the module to each of the two numbers 795 and 792, he does not obtain the same assembler code at the end of the decoding. It is then far more complicated for the attacker to single out the right code between the two codes obtained.

These examples are of course purely illustrative and are proposed only for a clear understanding of the proposed technique. It can be understood that, for a complete integration of a language such as the assembler:

the types of instructions are more numerous (this is also the case for the cardinality and the identifiers);

the number of registers is greater (this is also the case for the cardinality and the identifiers of these registers);

rather than list the possible of the values of the arguments of the instructions (4, 1 and 80h in the example) and determine their cardinal and their identifier (which is daring or even sub-optimal), it is preferable to carry out a direct conversion of these values of arguments into integers within the encoding module;

the separators (line feed, space «», comma «,», semi-colon «;», etc.) can also be subjected to an integration in order to facilitate the encoding and the decoding (related with the grammar).

5.3. Implementing Device

Figure 3:
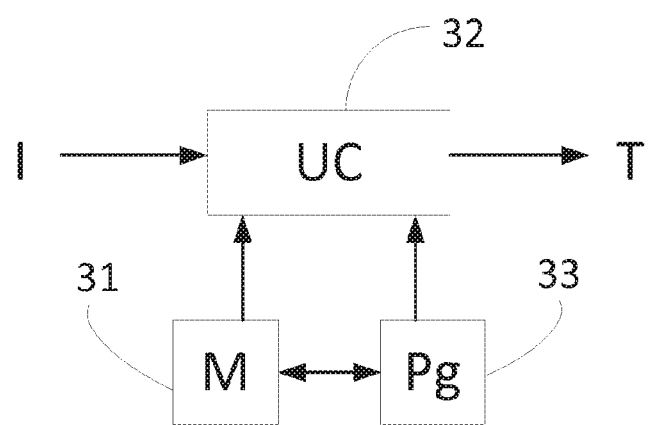
FIG. 3 is a simplified representation of a device for implementing the present technique.

Referring to FIG. 3, we describe a device comprising means for executing the method described here above.

For example, the device comprises a memory 31 constituted by a buffer memory, a processing unit 32, equipped for example with a microprocessor and driven by the computer program 33, implementing the steps required for the encryption and/or decryption and/or encoding and/or decoding as described here above.

At initialization, the code instructions of the computer program 33 are for example loaded into a memory that has to be executed by the processor of the processing unit 32. The processing unit 32 inputs for example an assembler code or an intermediate code to be encrypted or encoded. The microprocessor of the processing unit 32 implements the steps of the method of encryption and/or encoding according to the instructions of the computer program 33 to carry out a conversion of the assembler code or of the intermediate code.

To this end, the device comprises, in addition to the buffer memory 31, means for computing long computer strings and/or means for computing long integers and, possibly, an encryption processor and, possibly, communications means such as network communications modules although these are not indispensable. These means can be driven by the processor of the processing unit 32 on the basis of the computer program 33. These means also take the form of software or hardware modules specifically or non-specifically dedicated to the implementing of the present technique. Besides, the processor in charge can be a secured processor enabling protection against an attack during the phases of encryption or decryption.

The invention claimed is:

1. A method, performed by an encrypting device, for encrypting a code to be encrypted of a computer program using an encryption key selected from among at least two encryption keys, method comprising:
   obtaining a descriptive grammar of the language of the code to be encrypted, the code to be encrypted being an executable binary or byte code;
   encoding the code to be encrypted by using the descriptive grammar delivering a character string within which at least one start instruction of the code to be encrypted is encoded as a representation in the character string, wherein the encoding is implemented recursively, the representation of the start instruction being computed at the end of a preliminary computation of a representation of a following instruction of the code to be encrypted; and
   encrypting the character string by using an encryption key belonging to a set of the at least two encryption keys, the encrypting delivering an encrypted string.

2. The method for encrypting according to claim 1, wherein the encoding comprises, for a start instruction of the code to be encrypted, obtaining, within said descriptive grammar, a type of start instruction and obtaining, within said descriptive grammar, an identifier of the start instruction within a cardinal of the type of start instruction.

3. The method for encrypting according to claim 2, wherein the encoding comprises, for the start instruction of the code to be encrypted, computing said representation as a function of said type of start instruction and said identifier of the start instruction within the cardinal of the type of start instruction.

4. The method for encrypting according to claim 1, wherein the encoding delivers the character string, which comprises a unique integer.

5. A device for encrypting a code to be encrypted of a computer program by using an encryption key selected from among at least two encryption keys, the device comprising
   a processor; and
   a non-transitory computer-readable medium comprising instructions stored thereon, which when executed by the processor configure the device to perform acts comprising:
   obtaining a descriptive grammar of the language of the code to be encrypted, the code to be encrypted being an executable binary or byte code;
   encoding the code to be encrypted by using the descriptive grammar delivering a character string within which at least one start instruction of the code to be encrypted is encoded as a representation in the character string, wherein the encoding is implemented recursively, the representation of the start instruction being computed at the end of a preliminary computation of a representation of a following instruction of the code to be encrypted; and
   encrypting the character string by using an encryption key belonging to a set of the at least two encryption keys, the encrypting delivering an encrypted string.

6. A non-transitory computer-readable medium comprising a computer program product stored thereon a processor, wherein the program product comprises program code instructions for executing a method for encrypting a code to be encrypted of a computer program, when the instructions are executed on the processor of an encrypting device, wherein the method comprises:
   obtaining a descriptive grammar of the language of the code to be encrypted, the code to be encrypted being an executable binary or byte code;
   encoding the code to be encrypted by using the descriptive grammar delivering a character string within which at least one start instruction of the code to be encrypted is encoded as a representation in the character string, wherein the encoding is implemented recursively, the representation of the start instruction being computed at the end of a preliminary computation of a representation of a following instruction of the code to be encrypted; and
   encrypting the character string by using an encryption key belonging to a set of at least two encryption keys, the encrypting delivering an encrypted string.

7. A method, performed by a decrypting device, for decrypting a code of a computer program by using an encryption key selected from among at least two encryption keys, wherein the method comprises:
   obtaining an encrypted character string;
   obtaining an encryption key belonging to a set of the at least two encryption keys;
   decrypting the encrypted character string by using the obtained encryption key, the decrypting delivering a character string;
   obtaining a descriptive grammar of the language of the code to be decrypted, the code to be decrypted being an executable binary or byte code; and
   decoding the character string by using the descriptive grammar delivering a decoded character string within which at least one representation in the character string is decoded as an instruction in a decoded character string, the decoding being implemented recursively.

8. A device for decrypting a code of a computer program by using an encryption key selected from among at least two encryption keys, wherein the device comprises:
   a processor; and
   a non-transitory computer-readable medium comprising instructions stored thereon, which when executed by the processor configure the device to perform acts comprising:
   obtaining an encrypted key;
   obtaining an encryption key belonging to a set of at least two encryption keys;

decrypting the encrypted string by using the encryption key, the decrypting delivering a character string;

obtaining a descriptive grammar of the language of the code to be decrypted, the code to be decrypted being an executable binary or byte code; and decoding the character string by using the descriptive grammar delivering a decoded character string within which at least one representation in the character string is decoded as an instruction in a decoded character string, said decoding being implemented recursively.

9. A non-transitory computer-readable medium comprising a computer program product stored thereon, wherein the program product comprises program code instructions for executing a method for decrypting a code of a computer program, when the instructions are executed on a processor of a decrypting device, wherein the method comprises:

obtaining an encrypted character string;

obtaining an encryption key belonging to a set of at least two encryption keys;

decrypting the encrypted character string by using the obtained encryption key, the decrypting delivering a character string;

obtaining a descriptive grammar of the language of the code to be decrypted, the code to be decrypted being an executable binary or byte code; and decoding the character string by using the descriptive grammar delivering a decoded character string within which at least one representation in the character string is decoded as an instruction in a decoded character string, the decoding being implemented recursively.

* * * * *